Sept. 5, 1933.                J. HOLLAND-LETZ                 1,925,395
          CONVEYING MECHANISM FOR GRINDING MILLS AND THE LIKE
                Filed Sept. 29, 1930         2 Sheets-Sheet 1
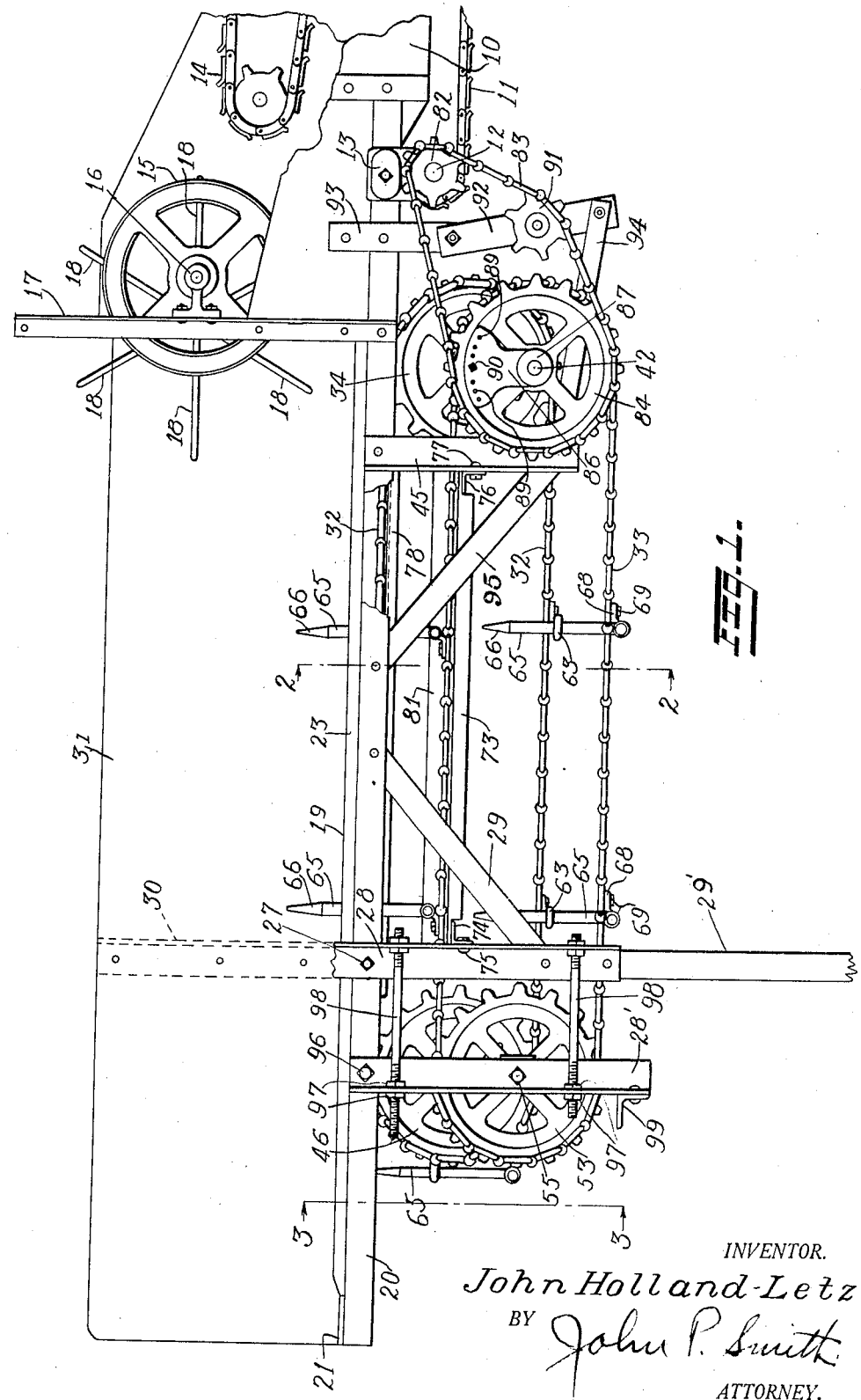
INVENTOR.
John Holland-Letz
BY John P. Smith
ATTORNEY.

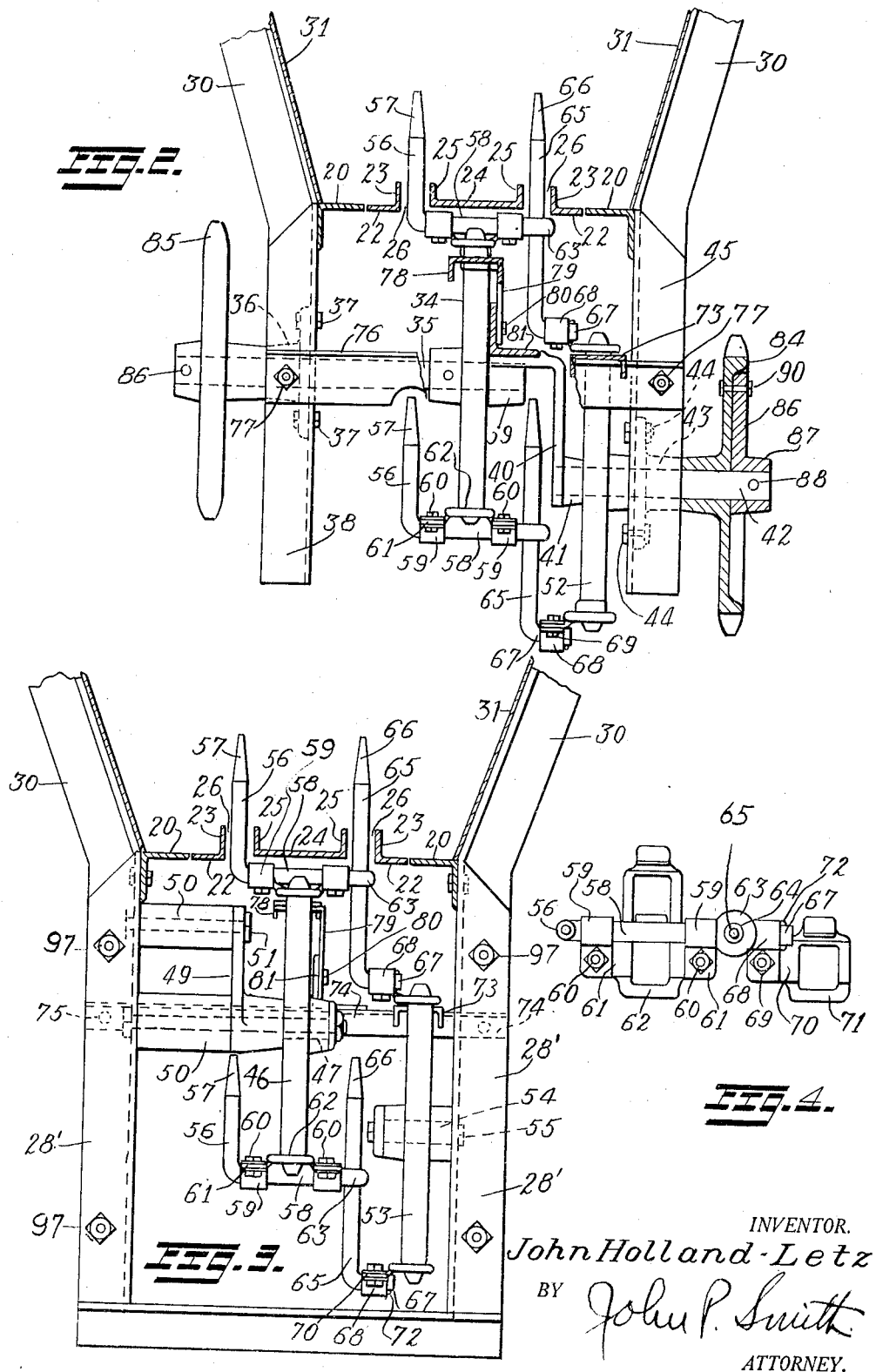

Patented Sept. 5, 1933

1,925,395

UNITED STATES PATENT OFFICE 1,925,395

CONVEYING MECHANISM FOR GRINDING MILLS AND THE LIKE

John Holland-Letz, Crown Point, Ind., assignor to The Letz Manufacturing Company, a corporation of Indiana Application September 29, 1930
Serial No. 485,160

16 Claims. (Cl. 198—168)

The present invention is directed to grinding machines and the like, but more particularly to conveying or feeding mechanism therefor for the purpose of conveying fluffy material such as hay, to the grinding mechanism.

One of the objects of the present invention is to provide a new and improved construction of conveying mechanism which is positive in action in that it will positively feed and convey the hay or other fluffy material after the same has been once placed in the hopper.

A further object of the invention is to provide a novel and improved conveying mechanism in the form of a plurality of pairs of tines which travel in parallel relation with respect to each other so as to convey positively and force the bulky material to the cutter head or grinding mechanism of the grinding machine.

A further object of the invention is to provide a novel and improved conveying mechanism in combination with a relatively stationary and eccentrically actuated tined drum for positively feeding hay or other fluffy material to the cutter head and grinding mechanism of the grinding machine.

These and other objects are accomplished by providing a construction and an arrangement of the various parts in a manner hereinafter described and particularly pointed out in the appended claims.

Referring to the drawings:

Fig. 1 is a fragmentary side elevational view of a grinding machine showing my improved conveying mechanism embodied therein. In this view, one side of the hopper is removed for the purpose of clearness;

Fig. 2 is a cross sectional view taken on the line 2—2 of Fig. 1;

Fig. 3 is a cross sectional view taken on the line 3—3 in Fig. 1; and

Fig. 4 is an enlarged top plan of adjacent links of the conveyor chains showing the manner in which the tines of each chain cooperate with the other.

For the purpose of showing one embodiment of my invention, I have shown the same in connection with a grinding mill, only a portion of which is shown in Fig. 1 of the drawings. This grinding mill comprises briefly, a frame structure 10, which has mounted therein, a horizontal short conveyor 11 which is trained about suitable sprockets secured to a shaft 12 mounted in suitable bearings 13 secured to the frame 10. Positioned above the endless conveyor 11 and forwardly of the cutter head (not shown) is a floating feed belt 14 of a construction described and claimed in my co-pending application, Serial Number 473,305, filed August 6, 1930. The floating free end of the feed belt 14 is located adjacent the cutter head, as is clearly disclosed in the aforementioned co-pending application.

My improved conveying mechanism is also used in connection with a relatively stationary revolving drum which is provided with eccentrically actuated revolving tines, identically like the revolving drum disclosed in the aforementioned co-pending application. This revolving drum is generally indicated by the reference character 15 and is mounted in suitable bearings 16, which in turn, are secured to the vertical side frame angle members 17. Mounted on a shaft located eccentrically with respect to the axis of the drum 15, are a plurality of tines 18 which are adapted to protrude through the periphery of the drum 15 on the forward side and withdrawn from the rearward side or the side adjacent the floating apron 14 in the manner more clearly described in my previously mentioned co-pending application.

My improved conveying mechanism comprises a table or frame generally indicated by the reference character 19. This table 19 comprises essentially, two longitudinally extending angle frame members 20 which are secured to the main frame members 10 of the grinding mill. The forward end of these side frame members 20 are connected by a transverse bar 21. Secured to the inner sides of each of angle members 20 are two supplemental angle members 22. These angle members 22 have one of their legs, as shown at 23, extending upwardly from the surface of the table 19. Mounted between each of these legs 23 of the angles 22 is a U-shaped or channel member 24 which has its outer legs extending upwardly as shown at 25 so as to form in effect longitudinal slots 26 therebetween throughout the length of the table 19 for permitting the tines or fingers hereinafter described to extend therethrough and travel therealong for conveying the material to the cutter head of the grinder. Secured to outer legs of each of the angle members 20 by means of bolts 27 are two vertically disposed angle members 28 which are suitably braced to the table by means of braces 29. The upper ends of these members 28 are slightly angled outwardly as shown at 30 so as to form a support for the sheet metal side 31 of the hopper. Secured to the lower ends of the angle members 28 are supporting legs 29' for supporting the table.

One of the primary features of the present invention is directed to a novel arrangement of a conveying mechanism in which two sets of endless chains are located at different distances below the lower surface of the table and are provided with cooperating tines or fingers in such a manner that the tines or fingers are maintained in vertical position as they travel along the table and extend upwardly through the longitudinal slots in the table.

This novel conveying mechanism comprises two sets of chains generally indicated by the reference character 32 and 33. One end of the upper chain 32 is trained about a drive sprocket wheel 34 which is secured to a shaft 35 journaled in a bearing 36. The bearing 36 is secured by means of bolts 37 to an angle bracket 38, which in turn, is secured to one of the table frame members 20 as clearly shown in Fig. 2. The inner end of the shaft 35 is journaled in a bearing 39. Formed integrally with the bearing 39 is an angularly and downwardly extending arm 40 which has its lower end provided with a bearing barrel portion 41. Journaled in the bearing barrel portion 41 is a shaft 42. An intermediate portion of the shaft 42 is also journaled in a bearing 43, secured by means of bolts 44, to a downwardly extending angle bracket 45, which in turn, is secured to one of the angle frame members 20. The upper chain 32 is also trained about a second sprocket wheel 46 which is journaled on a stud 47. The stud 47 is secured by means of a bolt 47' to a downwardly extending angle member 28' through the medium of a bracket 49 to spacer blocks 50. One of the spacer blocks 50 securely supports the upper end of the bracket 49 by means of a bolt 51. The lower chain 33 is trained about a sprocket wheel 52 journaled on the shaft 42. The other end of chain 33 is trained about a sprocket wheel 53 which in turn is journaled on a stud 54 secured by means of a bolt 55 to one of the angle members 28'. The upper chain belt 32 is provided, at spaced apart intervals, with tines or fingers generally indicated by the reference characters 56. The tines 56 are provided with a vertically extended pointed portion 57 and a horizontal portion 58 which is arranged at right angles with respect to the vertical portion. The horizontal portion 58 of the tine 56 is journaled in bearing clips 59 which are bolted by means of bolts 60 to laterally extending ears 61 formed on certain of the links 62 of the chain 32. One end of the horizontal portion 58 of the finger or tine 56 is provided with an enlarged head as shown at 63 in the center of which is a vertically extending aperture 64, which is adapted to reciprocally receive a cooperating tine or finger 65. The tines or fingers 65 are operatively connected up with the lower chain 33 at proper spaced intervals in alignment with the cooperating links 56 of the upper chain 32. The tine or finger 65 has a similarly pointed vertical portion 66 and a horizontal portion 67 which is arranged at right angles with respect to the vertical portion. The horizontal portion 67 is journaled in a bearing clip 68 secured by means of a bolt 69 to a laterally extending ear 70 formed integrally with and to one side of the link 71 of the lower chain 33. The tines or fingers 65 are prevented from displacement from their bearing portions or clips 68 by means of cotter pins 72. These tines or fingers are adapted to extend upwardly through the longitudinal slots 26 formed in the table 19, during the longitudinal movement of the upper laps of the chain 32 and 33. The upper laps of the chain 33 is guided and supported in a horizontal plane by an inverted U-shaped or channel member 73, which extend longitudinally of the frame of the conveyor underneath the chain. One end of the channel member 73 is secured to a transverse angle member 74 which in turn is secured by bolts 75 to the opposite angle members 28. The other end of the guide 73 is secured to a transverse angle member 76, which in turn, is secured by means of bolts 77 to the opposite angle brackets 38 and 45 respectively. The upper lap of the chain 32 is supported on and maintained in a horizontal plane by a horizontally extending guide member 78 which is preferably in the form of an inverted U-shaped member or channel. This guide member 78 is supported at both ends by an L-shaped member 79, which in turn, is secured by means of a bolt 80 to a longitudinal extending angle brace 81. The angle brace 81 is secured at its opposite ends to the transverse angle members 74 and 76 respectively.

Power is transmitted to each of the conveyor chains 32 and 33 through the shaft 12 of the lower conveyor apron 11. Mounted on the opposite ends of the shaft 12 are sprockets 82 which are trained by means of chains 83 to the sprocket wheels 84 and 85 respectively, which are located on the opposite side of the machine. The sprocket wheel 85 is secured by means of a pin 86 to the shaft 35. The sprocket wheel 84 is journaled on the shaft 42.

In order to properly time the chains with respect to each other for maintaining the fingers or tines 56 and 65 in proper registering alignment so that these tines or fingers project vertically through their respective slots 26, I have provided an adjustment which includes a segmental arm 86 which is provided with a hub 87. The hub 87 is seamed to the shaft 42 by means of a pin 88. The outer or segmental portion of the arm 86 is provided with a plurality of apertures as shown at 89 so that a bolt 90 may be adjustably secured in one of the various apertures for securing the arm in different positions of adjustment with respect to the sprocket wheel 84. It will be readily seen that by removing the bolt 90 and adjusting the arm 86 with respect to the sprocket wheel 84, that the chains 32 and 33 may be adjusted longitudinally with respect to each other for properly aligning the links of both chains so that the tines or fingers 56 and 65 project vertically upward in proper alignment.

Each of the chains 83 is provided with a chain tightener in the form of an idler sprocket wheel 91 journaled on a bar 92 which in turn, is secured to one of the frame angles 20. The lower end of the bar 92 is braced against longitudinal movement by connecting bar 94 which has one end thereof connected to the vertical bracket 45 and the other end thereof connected to bar 92. The vertical bracket 45 is braced against the longitudinal movement by a diagonal brace 95 which has one end connected with the angle member 20 and the other end thereof connected to the lower end of the vertical bracket 45.

The tension of each of the chains 32 and 33 is adjusted by longitudinally moving the supports or vertical angle members 28' which carries the sprocket wheels 46 and 53 respectively. This adjustment is made by loosening the bolts 96 which extend through slotted apertures in the frame members 20 and serves to fasten the upper end of the angle members 28' to the side frame members 20. By adjusting the nuts 97 on each of the bolts 98 the tension on the chains 32 and 33 may be adjusted. The lower ends of the angle members 28' are secured by a transverse angle brace 99.

From the above description it will be readily seen that by arranging two sets of chains, one of slightly higher elevation than the other and cooperatively connecting the tines or fingers of the respective chains together, a relatively simple, positive and efficient conveying mechanism is provided for conveying the hay or other fluffy material to the cutter head of the grinding mill, and it will also be seen that by arranging a relatively narrow hopper so that only a predetermined amount of material may be placed therein, the hazard of overcrowding the grinding machine is reduced to a minimum. It will also be observed that by arranging these relatively long tines extending through the bottom of the hopper, a positive means is provided for forcing the material and the conveying of the same to the cutter head.

While in the above specification I have described one embodiment which my invention may assume in practice, it will of course, be understood that the same is capable of modification and that modification may be made without departing from the spirit and scope of the invention as expressed in the following claims.

What I claim is my invention and desire to secure by Letters Patent is:

1. A conveying mechanism for grinding mill comprising a plurality of chains trained about sprockets, a plurality of tines pivoted to said chains, and means for operatively connecting the adjacent tines together whereby all of said tines are maintained in parallel relation with respect to each other.

2. A conveying mechanism for grinding mill comprising a frame having a substantially horizontal table, there being longitudinal slots formed in said table, endless chains positioned below said table, and tines carried by each of said chains certain of said tines having a sliding movement with respect to other of said tines and all of said tines extending through the slots in said table for conveying material to said grinding mill.

3. A conveying mechanism for a grinding machine comprising a substantially horizontal table having longitudinal slots formed therein, a plurality of chains positioned below said table, conveying fingers pivoted to certain links of said chains, and means for operatively connecting the adjacent fingers of each chain directly together whereby a predetermined angular position of the fingers are maintained.

4. A conveying mechanism for a grinding mill, comprising a frame, including a horizontal table having longitudinal slots formed therein, endless chains positioned below the slots of said table, spaced apart fingers carried by certain links of said chain and means for operatively connecting certain of said fingers directly together for relative movement with respect to each other whereby said fingers travel in parallelism throughout the travel of said chains.

5. A conveying mechanism for a grinding machine comprising a horizontal table having longitudinal slots formed therein, two endless chains positioned at different levels below the top of said table, spaced apart fingers carried by each of said chains, the fingers on said lower chain operatively connected with the fingers on said upper chain for maintaining said fingers in a vertical position throughout their entire movement for conveying the material over said table into said grinding machine.

6. A conveying mechanism for a grinding machine comprising a longitudinally extending table having longitudinal slots formed therein, a pair of conveying chains positioned below said table at different elevations with respect to said table, sprocket wheels located at the opposite ends of said table over which said chains are trained, and cooperating fingers carried by each of said chains and extending through the slots of said table for conveying the material from said table to said grinding mechanism.

7. A conveying mechanism for grinding machine comprising a longitudinally extending table, sprocket wheels positioned below said table and on the opposite ends thereof, certain of said sprocket wheels being located below certain other sprocket wheels, endless chains trained about said sprocket wheels, spaced apart fingers carried by one of said chains and having right angularly bent portions, spaced apart fingers carried by the other chain and located in alignment with the fingers on the first named chain, said second named fingers extending through the right angularly bent portion of the first named fingers for maintaining both of said fingers in vertical position through the slots of said table for conveying the material from said table to said grinding mechanism.

8. A conveying mechanism for a grinding machine and the like, comprising a longitudinally extending frame having longitudinally spaced apart slots formed therein, a pair of endless chains located below said frame, the upper lap of one of said chains being located below the upper lap of the other of said chains, spaced apart fingers journaled in certain of the links of one of said chains, spaced apart fingers journaled in certain of the links of the other of said chains and in alignment with said first named fingers, and means for operatively connecting said fingers together whereby said fingers travel in parallel planes through the slots in the top of said table.

9. A conveying mechanism for grinding mill or the like machine, comprising a frame, longitudinally extending slots formed on the top of said frame, a plurality of endless chains positioned below said frame and arranged to have their upper laps travel parallel to said frame, spaced apart fingers journaled in certain links in one of said chains, said fingers having enlarged heads on one end thereof, there being apertures in said enlarged heads, spaced apart fingers arranged in alignment with said first named fingers and carried by other chain, said second named fingers extending through the apertures in said first named fingers for maintaining said fingers in vertical plane as they travel along said frame.

10. A conveying mechanism for grinding mills and the like machine, comprising a horizontal table frame, longitudinal slots formed in said frame, a pair of endless chains positioned below said table, spaced apart fingers carried by each of said chains and protruding through the slots in said table, and means formed as a part of said fingers whereby each finger is operatively connected and movable relatively to its co-acting finger for maintaining said finger in the vertical position as it travels longitudinally in the slots of said table for conveying the material along said table.

11. A conveying mechanism, comprising a longitudinally extending table, a relatively stationary conveying mechanism positioned adjacent one end of said table, a floating conveyor positioned over said stationary conveying mechanism, a revolving tined drum positioned adjacent said floating conveyor, said table having longitudinal slots formed therein, a conveying mechanism comprising a pair of endless chains located below said table, and a plurality of spaced apart fingers carried by each of said chains certain of said fingers being directly and operatively connected together whereby said fingers are maintained in a vertical plane as they travel through the slots of said table.

12. In a feeding mechanism, the combination with a frame, a horizontal conveyor carried by said frame, a floating conveyor positioned over said horizontal conveyor, a revolving tined drum positioned adjacent said floating conveyor, a longitudinally extending table having longitudinal slots formed therein, two endless chains located below said table and operatively driven by said horizontal conveyor, and spaced apart sets of fingers connected to each of said chains the cooperating fingers of each set being directly and operatively connected together for maintaining said fingers in vertical position for conveying the material to said cutter head.

13. A conveying mechanism for a grinding mill or the like machine, comprising a table frame, a revolving drum having a plurality of eccentrically operating tines positioned over said frame, a plurality of endless chains located below said table, a plurality of spaced apart fingers carried by and pivoted to each of said chains and operatively connected together for maintaining said fingers in a vertical plane as they travel along the slots of said table, and inclined walls on the opposite sides of said table so as to form in effect a hopper for the material over said fingers.

14. A feeding mechanism for grinding machines and the like comprising a hopper in which the side walls thereof are inclined slightly with respect to the vertical, a horizontal table forming the bottom of said hopper having longitudinal slots formed therein, a revolving tined drum located at the delivery end of said table, a pair of endless chains mounted below said table, and fingers arranged in spaced apart intervals carried by said chains, certain of said fingers being directly and operatively connected together, said fingers extending through the slots of said table for conveying the material to said grinding mill.

15. In a feeding mechanism the combination with a grinding mill or the like machine, including a hopper, having a horizontal bottom and inclined walls on the opposite sides thereof, there being longitudinal slots formed on the bottom of said hopper, a revolving tined drum located above and at the delivery end of said hopper, a plurality of endless belts located at different distances below the bottom of said hopper, spaced apart fingers carried by said belts and arranged in pairs to protrude through the slots in the bottom of said hopper, and means for operatively connecting said fingers together whereby said fingers are maintained in a vertical plane as they travel longitudinally in the bottom of said hopper.

16. A conveying mechanism for grinding mill and the like machine, comprising a horizontal frame having longitudinal slots formed therein, a pair of endless chains positioned below said frame, two sets of sprockets located at the opposite ends of said frame about which said chains are trained, cooperating sets of fingers carried by each of said chains in spaced relation along said chains, and means for adjusting the angular relation of said fingers with respect to their respective chains.

JOHN HOLLAND-LETZ.